US012569819B2

(12) United States Patent
Hunt et al.

(10) Patent No.: US 12,569,819 B2
(45) Date of Patent: Mar. 10, 2026

(54) REACTOR SPARGER ASSEMBLY

(71) Applicant: Solugen, Inc., Houston, TX (US)

(72) Inventors: Sean T. Hunt, Houston, TX (US);
Kenneth Keckler, Houston, TX (US)

(73) Assignee: SOLUGEN, INC., Houston, TX (US)

(*) Notice: Subject to any disclaimer, the term of this patent is extended or adjusted under 35 U.S.C. 154(b) by 729 days.

(21) Appl. No.: 17/924,061

(22) PCT Filed: May 27, 2021

(86) PCT No.: PCT/US2021/034621
§ 371 (c)(1),
(2) Date: Nov. 8, 2022

(87) PCT Pub. No.: WO2021/243083
PCT Pub. Date: Dec. 2, 2021

(65) Prior Publication Data
US 2023/0211358 A1 Jul. 6, 2023

Related U.S. Application Data

(60) Provisional application No. 63/031,257, filed on May 28, 2020.

(51) Int. Cl.
*B01J 4/00* (2006.01)
*B01F 23/21* (2022.01)
(Continued)

(52) U.S. Cl.
CPC .............. *B01J 4/004* (2013.01); *B01F 23/214* (2022.01); *B01F 23/454* (2022.01);
(Continued)

(58) Field of Classification Search
CPC . B01J 4/004; B01J 10/002; B01J 10/00; B01J 8/004; B01J 8/002; B01J 2204/002; B01J 2208/00902; B01J 2208/00911
See application file for complete search history.

(56) References Cited

U.S. PATENT DOCUMENTS

| | | | | |
|---|---|---|---|---|
| 2,786,742 A | * | 3/1957 | McKinley | .............. B01J 8/1827 |
| | | | | 159/DIG. 3 |
| 3,702,619 A | | 11/1972 | Son | |

(Continued)

FOREIGN PATENT DOCUMENTS

| | | |
|---|---|---|
| EP | 2190807 B1 | 10/2014 |
| EP | 2760571 B1 | 12/2015 |

(Continued)

OTHER PUBLICATIONS

Brazilian Office Action dated Mar. 18, 2025. for Brazilian Application No. 11 2022 023832 0 (6 p.).

(Continued)

*Primary Examiner* — Lessanework Seifu
(74) *Attorney, Agent, or Firm* — CONLEY ROSE, P.C.

(57) ABSTRACT

A reactor system includes a reactor vessel configured to contain a process fluid, and a sparger assembly that operably coupled to the reactor vessel and configured to supply a mixture of a gas and a recirculated process fluid to the reactor vessel. The sparger assembly includes a plurality of sparger chambers. Each sparger chamber includes a process fluid conduit fluidly coupled to a process fluid return of the reactor vessel via a process fluid inlet, wherein the process fluid inlet has a first block and bleed valve assembly. Each sparger chamber includes a sparger conduit fluidly coupled to the process fluid conduit and a sparger disposed within the sparger conduit and fluidly coupled to a gas source via a gas inlet. Each sparger chamber also includes a process fluid-gas mixture outlet that fluidly couples the sparger conduit to a sparger outlet of the reactor vessel.

20 Claims, 6 Drawing Sheets

(51) Int. Cl.

| | |
|---|---|
| *B01F 23/454* | (2022.01) |
| *B01F 23/80* | (2022.01) |
| *B01F 25/53* | (2022.01) |
| *B01J 8/00* | (2006.01) |
| *B01J 10/00* | (2006.01) |
| *B03D 1/14* | (2006.01) |
| *B01F 101/44* | (2022.01) |

(52) U.S. Cl.

CPC ............ *B01F 23/808* (2022.01); *B01F 25/53* (2022.01); *B01J 8/002* (2013.01); *B01J 8/004* (2013.01); *B01J 10/002* (2013.01); *B03D 1/1431* (2013.01); *B03D 1/1493* (2013.01); *B01F 2101/44* (2022.01); *B01J 2208/00902* (2013.01); *B01J 2208/00911* (2013.01); *B01J 2219/0036* (2013.01)

(56) References Cited

U.S. PATENT DOCUMENTS

| | | | |
|---|---|---|---|
| 4,735,709 A | | 4/1988 | Zipperian |
| 4,808,383 A | * | 2/1989 | Buyan .................... C10G 11/18 422/140 |
| 5,049,320 A | | 9/1991 | Wang et al. |
| 5,108,583 A | * | 4/1992 | Keon .................... B01J 8/1818 239/501 |
| 9,731,252 B2 | | 8/2017 | Ikeda |
| 10,618,059 B2 | | 4/2020 | Nepomuceno do Valle |
| 2005/0274648 A1 | | 12/2005 | Goldstein et al. |
| 2006/0047142 A1 | | 3/2006 | Wonders et al. |
| 2007/0254965 A1 | | 11/2007 | Boer et al. |
| 2010/0002534 A1 | | 1/2010 | Zimmerman et al. |
| 2013/0082125 A1 | | 4/2013 | Akin et al. |
| 2019/0226592 A1 | | 7/2019 | Hussein et al. |

FOREIGN PATENT DOCUMENTS

| | | |
|---|---|---|
| JP | 54-14344 | 6/1979 |
| JP | S58190437 U | 12/1983 |
| JP | 62-155769 | 10/1987 |
| JP | 2007533832 A | 11/2007 |
| JP | 2014534808 A | 3/2017 |
| JP | 2016140801 A | 11/2017 |

OTHER PUBLICATIONS

Wong, Chun Ming et al. "Glucose Oxidase: Natural Occurrence, Function, Properties and Industrial Applications," Applied Microbiology and Biotechnology, Apr. 2008, vol. 78, No. 6, pp. 927-938 (12 p.).

Japanese Decision of Rejection dated Aug. 5, 2025, for Japanese Application No. 2022-572642 (4 p.).

English Translation of Japanese Decision of Rejection dated Aug. 5, 2025, for Japanese Application No. 2022-572642 (3 p.).

PCT/US2021/034621 International Search Report and Written Opinion dated Sep. 9, 2021 (16 p.).

European Search Report dated Jun. 18, 2024, for European Application No. 21814036.6 (13 p.).

Search Report and Written Opinion dated Dec. 20, 2023, for Singapore Application No. 11202260423U (15 p.).

Japanese Office Action dated Mar. 4, 2025. for Japanese Application No. 2022-572642 (4 p.).

English Translation of Japanese Office Action dated Mar. 4, 2025. for Japanese Application No. 2022-572642 (3 p.).

Australian Examination Report dated Feb. 4, 2026, for Australian Application No. 2021282373 (4 p.).

* cited by examiner

REACTOR SPARGER ASSEMBLY

CROSS-REFERENCE TO RELATED APPLICATIONS

This application is a 35 U.S.C. § 371 U.S. National Stage Entry application of PCT/US2021/034621 filed May 27, 2021, and entitled "Reactor Sparger Assembly," which claims the benefit of U.S. Provisional Application No. 63/031,257 filed on May 28, 2020 and entitled, "Reactor Sparger Assembly," each of which is hereby incorporated herein by reference in its entirety for all purposes.

STATEMENT REGARDING FEDERALLY SPONSORED RESEARCH OR DEVELOPMENT

Not applicable.

BACKGROUND

Spargers are typically designed to be located at the bottom of a reactor vessel, beneath a large volume of a process fluid, and designed to introduce a gas flow into the process fluid to promote a chemical or biological process. Depending on the system, the process fluid may contain both liquids and solids, including small particulates that can clog or otherwise obstruct the operation of the spargers. Servicing conventional spargers typically involves taking the reactor offline and draining the process fluid from the reaction vessel to access, clean, and/or repair the spargers. However, draining the process fluid from the reaction vessel can take hours or days, resulting in substantial operational costs and delays.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a reactor system includes a reactor vessel configured to contain a process fluid, and a sparger assembly that is operably coupled to the reactor vessel and configured to supply a gas and a recirculated process fluid to the reactor vessel. The sparger assembly can include a plurality of sparger chambers. Each sparger chamber can include a process fluid conduit fluidly coupled to a process fluid return of the reactor vessel via a process fluid inlet, where the process fluid inlet has a first block and bleed valve assembly. Each sparger chamber can include a sparger conduit fluidly coupled to the process fluid conduit and a sparger disposed within the sparger conduit and fluidly coupled to a gas source via a gas inlet. Each sparger chamber also includes a process fluid-gas mixture outlet that fluidly couples the sparger conduit to a sparger outlet of the reactor vessel, wherein the process fluid-gas mixture outlet comprises a second block and bleed valve assembly, wherein the first and second block and bleed valve assemblies are configured to enable the sparger to be fluidly isolated from the reactor vessel.

In an embodiment, a method of providing a gas to a fluid within a reactor comprises passing a process fluid to a sparger chamber through a first valve assembly, passing a gas through a sparger element within the sparger chamber, forming bubbles within the process fluid within the sparger chamber to form a mixed fluid, and passing the mixed fluid out of the sparger chamber and into a reactor vessel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
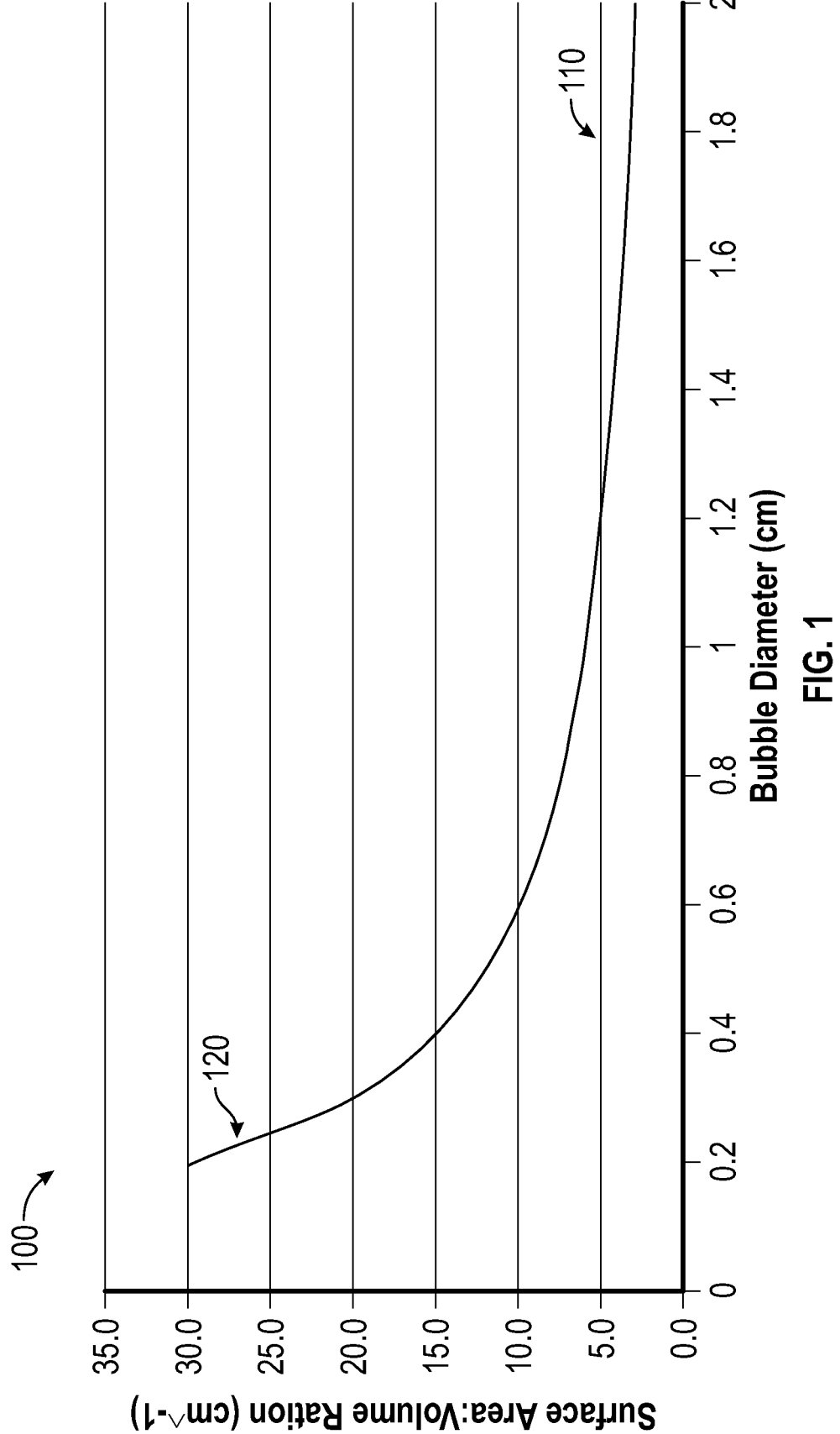
FIG. 1 is a graph representing the relationship between bubble diameter and a ratio of bubble surface area to bubble volume, in accordance with the presently disclosed embodiments.

One or more specific embodiments of the present invention will be described below. In an effort, to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The subject matter disclosed herein relates to a reactor (e.g., a bubble column) that utilizes a sparger and, more particularly, to a sparger assembly that enables a sparger to be fluidly isolated from a reactor vessel for servicing.

Traditional spargers may be located within the reactor vessel such that the entire vessel has to be drained to access the sparger for servicing. Further, traditional spargers are connected together such that the sparger has to be used as a single unit. Even if different rings or sections are used such that a portion of the overall sparger can be shut off, the sparger still cannot be accessed without draining the entire reactor vessel.

Further, the sparger can generally release a gas phase within the reactor vessel such that the gas leaves the spargers into the bulk flow of the fluid in the reactor vessel. It can be difficult to control the fluid flow around the sparger or induce any type of high speed flow as the gas is released within the reactor vessel.

Disclosed herein is a sparger design that places the sparger element within a sparging chamber than be in fluid communication with the reaction vessel and individually accessible for servicing without affecting the remaining sparging elements. As an example, a sparging element can be placed within a sparging chamber, and fluid can be passed through the sparging chamber to entrain the gas phase bubbles and pass them into the reactor vessel. The sparging chamber can be isolatable from the reactor vessel using one or more valves to allow each sparging chamber (or a group of sparging chambers) to be isolated from the reaction chamber from servicing.

In addition to allowing for ease of servicing, the sparger designs provided herein also allow for selective utilization of one or more spargers with the reactor. This allows for control over the fluid and/or gas phase flowrates and veloci-ties entering the reactor, the flow pattern within the reactor, and the ability to turn down the reactor as desired.

As discussed below, the disclosed embodiments include a reactor (e.g., bubble column reactor) having a sparger assembly. The sparger assembly can include a sparger plate having a number of sparger outlets disposed at or near the bottom of the reactor vessel. The sparger outlets can com-prise fluid communication pathways through the sparger plate to allow the flow of gas and/or recirculated process fluid to pass from the sparger chambers into the reactor. While any number of shapes or configurations are possible, in some aspects, the sparger outlets can be arranged in the sparger plate in a grid, pattern rings, concentric rings or the like. Each of the sparger outlets can be fluidly coupled to an independent sparger chamber, which can be fluidly coupled to a sparger chamber, which can be disposed outside of the reactor vessel and provide a flow of gas and/or recirculated process fluid into the reactor vessel.

The sparger chamber can be configured to provide a gas phase mixed with a fluid phase prior to the mixed fluid passing into the bulk fluid in the reactor. In some aspects, the sparger chamber may also be referred to as a sparger manifold. The sparger chamber can comprise a sparger disposed within an outer tubular element configured to receive a fluid flow around the sparger. This may be a pipe-in-pipe arrangement (e.g., the sparger pipe disposed within an outer pipe, etc.), a concentric arrangement, or any other arrangement in which a sparger element of any shape or size is disposed within an outer chamber fluidly coupled to a fluid source.

In some embodiments, each of the sparger chambers can include a sparger having one or more fine-pore sparging elements that create small diameter hubbies (e.g., around 0.2 centimeters (cm) in diameter or less) when a gas is supplied to the sparger at an appropriate pressure (e.g., a pressure above the fluid pressure) and flowed through the sparger into the surrounding fluid. As used herein, the sparging element may refer to the portion of the sparger that contains the pores or holes through which the gas flows to form bubbles in the surrounding fluid. The small bubble diameters can improve the interfacial area between the bubbles as they enter the reactor and rise through the process fluid within the vessel, allowing lower gas flowrates to be used to achieve the desired amount of gas-process fluid mixing.

As may be appreciated, the sparging elements that enable the production of smaller diameter bubbles may foul due to their smaller sized pores. Accordingly, the disclosed sparger chambers can include suitable valves that enable the sparger chamber to be isolated from the process fluid of the reactor vessel for servicing. That is, using the disclosed sparger chamber design, an individual sparger element may be removed and treated (e.g., maintained, repaired, cleaned, replaced, etc.) while the reactor vessel remains operational and the remaining spargers of the sparger assembly continue to operate. Accordingly, the presently disclosed embodi-ments enable the reactor vessel to run continuously, without taking the reactor offline to service one or more spargers. The disclosed embodiments also allow the number of sparg-ers operating with the reactor to each be independently set and operated.

Turning now to the figures, FIG. 1 is a graph 100 depicting the efficiency of a gas-liquid mixing vessel relative to a bubble size. More particularly, the graph 100 illustrates the relationship between bubble diameter and a ratio of bubble surface area to bubble volume. As shown, larger diameter bubbles (e.g., around 2 cm) have a lower surface area to volume ratio. These larger diameter bubbles, repre-sented by arrow 110 in the illustrated graph, may be pro-duced by conventional spargers. The presently disclosed embodiments produce smaller bubbles, having bubble diam-eters of less than about 0.5 cm in diameter. The smaller diameter bubbles, represented by arrow 110, represent an improved interfacial area between bubbles. It may be appre-ciated that the smaller-diameter bubbles may represent 2 to 10 times greater (e.g., 2×-10×) improvement in interfacial area between bubbles, compared to the larger-diameter bubbles. In addition to improved interfacial area between bubbles, the presently disclosed embodiments achieve suf-ficient gas-liquid mixing introducing a mixture of gas and recirculated process fluid via the sparger outlets of the reactor. Since it is presently recognized that liquid pumping consumes considerably less energy that pumping a gas, the disclosed sparger design achieves the desired level of gas-liquid mixing in a substantially more efficient manner when compared to reactors that rely on a high gas velocity and large gas bubbles to achieve the desired amount of gas-liquid mixing.

Figure 2:
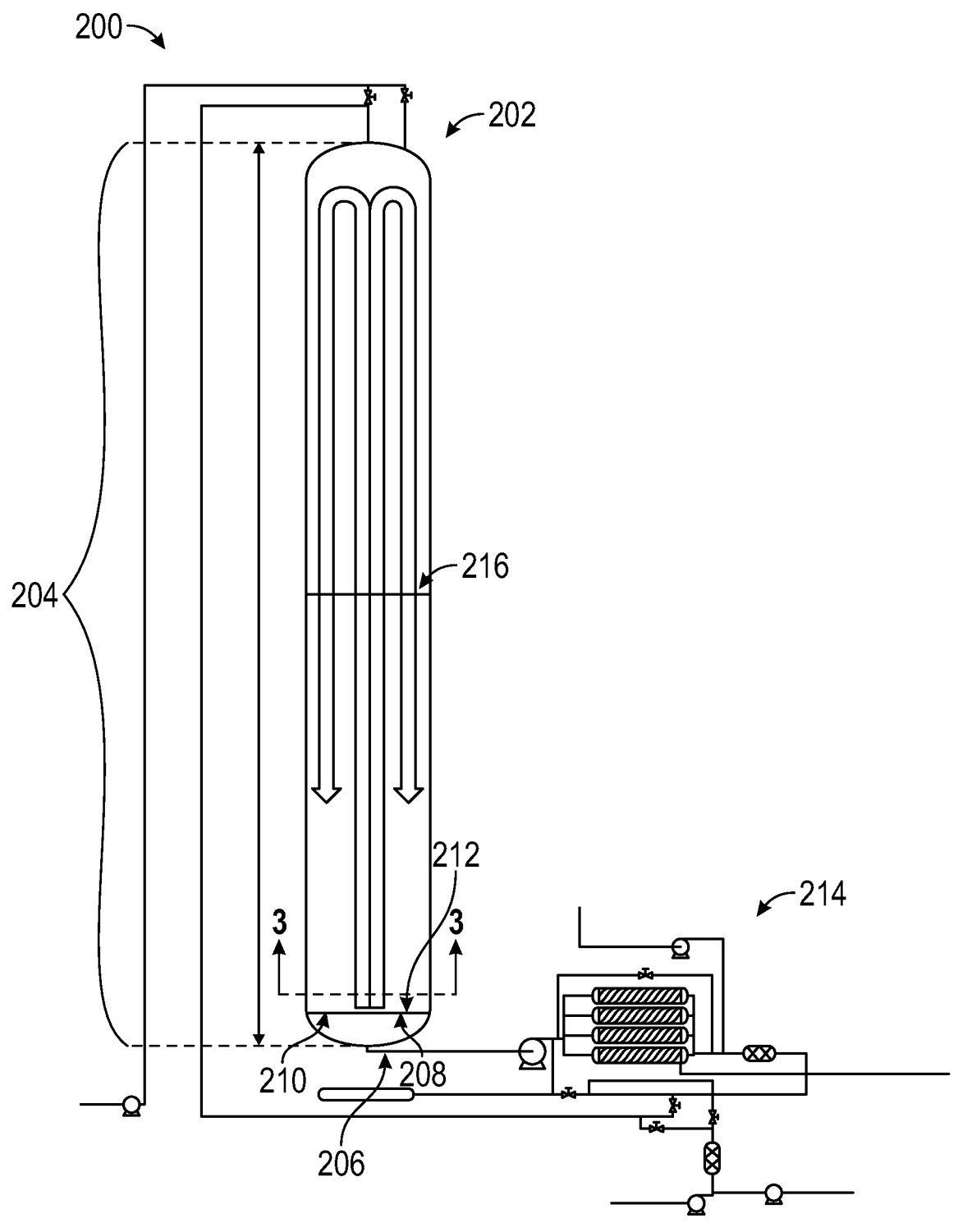
FIG. 2 is a schematic diagram of an embodiment of a reactor system including a reactor vessel having a sparger assembly, in accordance with the presently disclosed embodiments.

FIG. 2 is a schematic diagram of an embodiment of a reactor 200 (e.g., a bubble column reactor) that includes a sparger assembly 208, in accordance with present embodi-ments. The reactor 200 includes a reaction vessel 202, and the sparger assembly 208 includes a sparger plate 210 disposed at the bottom of the vessel 202. The sparger plate 210 is illustrated and discussed in greater detail with respect to FIG. 3, and a sparger chamber that feeds process fluid and gas to the sparger plate 210 is illustrated and discussed in greater detail with respect to FIG. 4. In certain embodiments, the sparger plate 210 may be formed within or serve as the bottom wall of the reaction vessel 202. The sparger plate 210 can include sparger outlets 212 designed to provide a gas flow and/or recirculated process fluid near the bottom of the reactor vessel 202, As may be appreciated, the gas under pressure at the bottom of the reactor vessel 202 is less dense than the liquid at the top of the vessel. As such, the gas introduced near the bottom of the reactor vessel 202 gener-ally rises towards the top of the vessel, resulting in addi-tional mixing of the gas and process fluid.

The reactor vessel 202 may have a process fluid return 206 disposed near the bottom of the reactor vessel 202. In one non-limiting example, a portion of the process fluid (e.g., 500 gallons per minute) from the reactor vessel 202 may be drawn through the process fluid return 206. In certain embodiments, at least a portion of the process fluid exiting the reactor vessel 202 via the process fluid return 206 may be directed to a purification or isolation system (e.g., nanofiltration unit 214), which can selectively isolate a product from the process fluid and enable the remaining process fluid to be reintroduced into the vessel 202. In other embodiments, the process fluid may be reintroduced into the reactor vessel 202 without purification or product isolation, In sonic aspects, the process fluid used with the sparger disclosed herein may be provided by fresh fluid entering the system and/or recycled fluid coming from a different portion of the system.

In different embodiments, the process fluid that is reintroduced or recirculated into the reactor vessel 202 can be delivered to the vessel in different manners. For example, at least a portion of the process fluid that is reintroduced into the reactor vessel 202 can be mixed with gas in a sparger chamber and then be reintroduced back into the vessel via the sparger outlets 212 of the sparger plate 210, as discussed below. Additionally, in certain embodiments, at least a portion of the process fluid can be reintroduced to the reaction vessel 202 via one or more sets of fluid recirculation nozzles 216 disposed above the sparger outlets that are positioned at or near the bottom of the vessel. In certain embodiments, a set of fluid recirculation nozzles 216 may include a ring of nozzles disposed about the inner circumference of the reactor vessel 202 and oriented to direct the reintroduced process fluid in a generally downward direction, toward the sparger outlets 212 of the sparger plate 210. The fluid recirculation nozzles 216 may be disposed at any suitable location along an axial length 204 of the reactor vessel 202. Additionally, in certain embodiments, the fluid recirculation nozzles 216 may be disposed within a bottom third (e.g., ⅓, 33%) of the axial length 204 of the reactor vessel 202. It is presently recognized that, for such embodiments, the gas and liquid mixing observed is generally more "plug-flow" like in the portion of the reactor vessel 202 that is above the recirculation nozzles, whereas the gas and liquid mixing may be more continuous or uniform in the portion of the reactor vessel 202 that is below the recirculation nozzles.

In some aspects, the sparger chambers may be opened to allow process fluid from within the reactor to flood the sparger chamber while gas is introduced through the sparger elements. In these embodiments, no fluid may be introduced into the sparger chamber to mix with the gas prior to the gas entering the reactor (other than the fluid entering from the reactor due to mixing from the introduction of the gas through the sparger element). In this aspect, the sparger chamber may still be isolated to service the sparger element.

Figure 3:
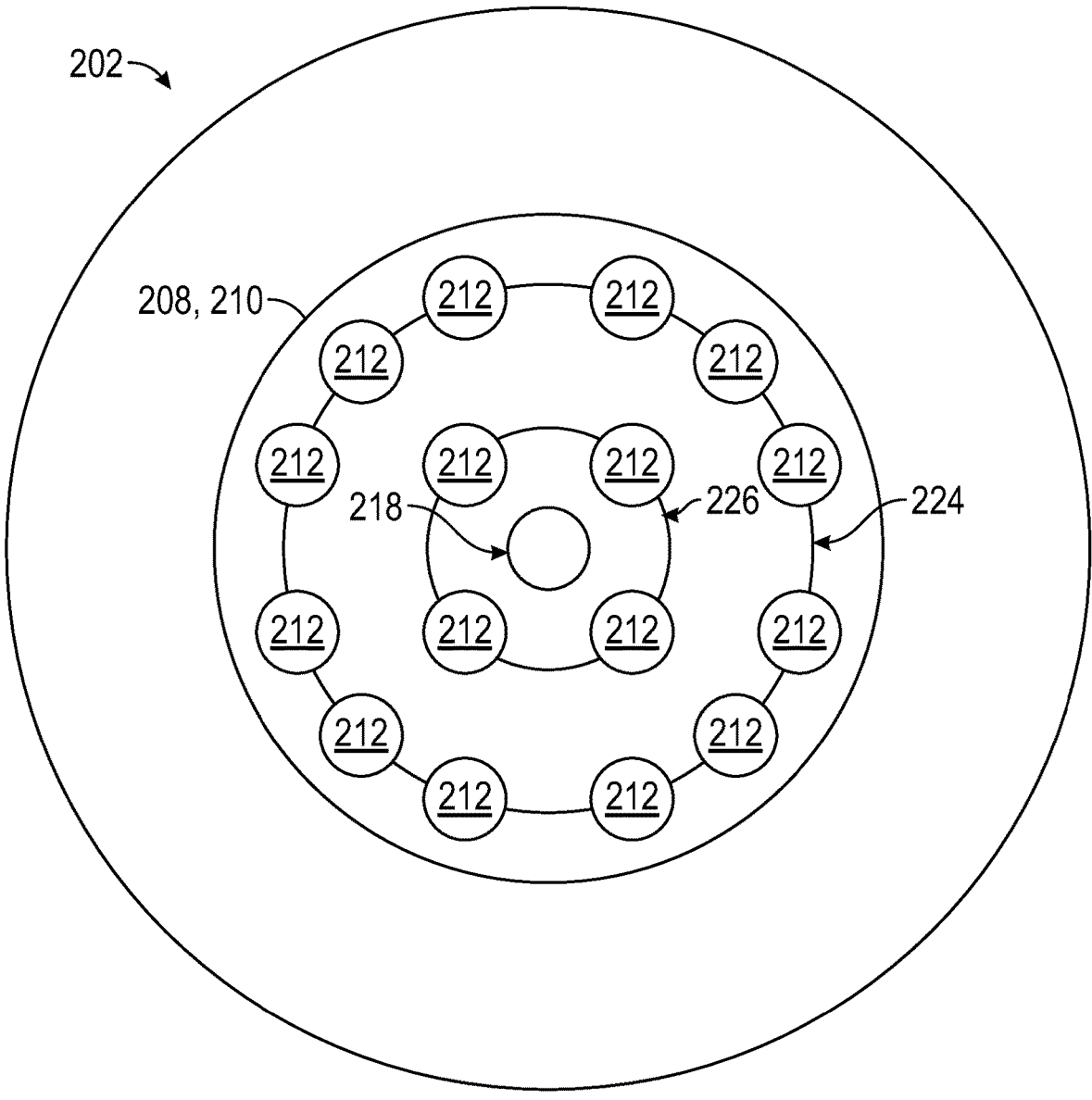
FIG. 3 is a schematic diagram of a sparger plate of the sparger assembly, in accordance with the presently disclosed embodiments.

FIG. 3 depicts a cross-sectional view through line 3-3 of the reactor vessel 202 of FIG. 2, More specifically, the FIG. 3 illustrates the sparger plate 210 of the sparger assembly 208, which is disposed near, or forms, the bottom of the reactor vessel 202. The sparger plate 210 can include a process fluid return inlet 218 disposed near the center of the sparger plate 210, and the process fluid return inlet 218 can be fluidly coupled to the process fluid return 206 of the reactor vessel 202 to enable the process fluid to exit the reactor vessel 202, as discussed above. The illustrated sparger plate 210 includes a number of sparger outlets 212 disposed around the process fluid return inlet 218, wherein each of the sparger outlets 212 can be fluidly coupled to receive a mixture of gas and process fluid from the outlet of a distinct sparger chamber, as discussed with respect to FIG. 4.

The sparger outlets 212 of the sparger plate 210 may be arranged in different manners for different embodiments of the sparger assembly 208. For example, the illustrated sparger plate 210 can have sparger outlets 212 arranged in an outer ring 224 and an inner ring 226. In other embodiments, other arrangements may be used, such as three rings, or a single outer ring. Additionally, for the illustrated sparger plate 210, the sparger outlets 212 can have a uniform spacing (e.g., between about 6 to 30 inches apart, or about 12 inches apart) to enable the gaseous bubbles to be dispersed uniformly within the reactor vessel 202. In one embodiment, one or more sparger outlets 212 may be positioned a distance from an outer wall of the reactor vessel 202, such as approximately 6-18 inches, 8-16 inches, or 10-12 inches, to enable sufficient mixing of the gas and process fluid within the vessel.

Figure 4:
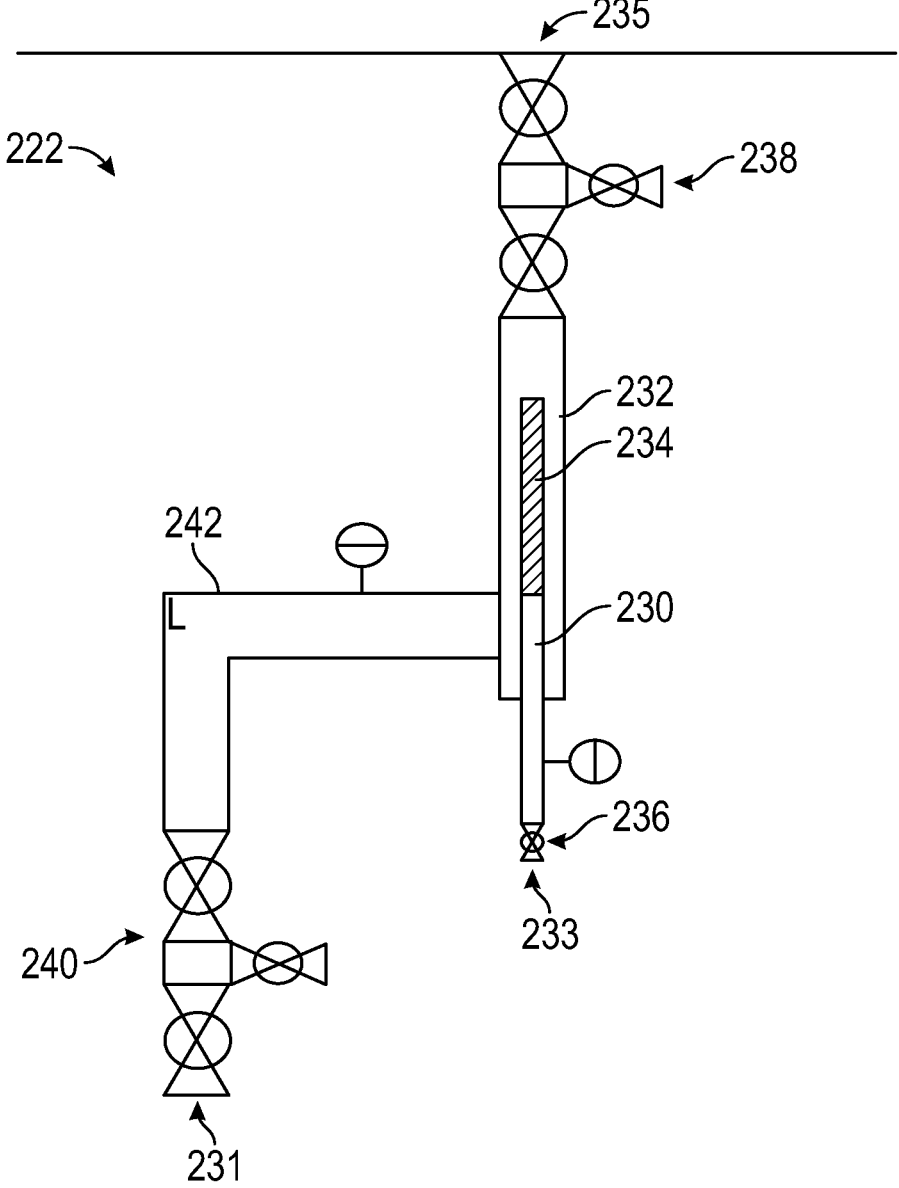
FIG. 4 is a schematic diagram of an embodiment of a sparger chamber of the sparger assembly, in accordance with the presently disclosed embodiments.

As mentioned, a portion of a process fluid can be reintroduced into the reactor vessel 202 via the sparging outlets 212, and each of the sparging outlets 212 can be supplied by a distinct or independent sparger chamber 222. FIG. 4 is a schematic diagram of an embodiment of a sparger chamber 222 of a sparger assembly 208. The illustrated sparger chamber 222 can include two inlets e.g., a fluid inlet 231 and a gas inlet 233) and a single outlet (a process fluid-gas mixture outlet 235), which can lead to a sparger outlet to provide a mixed fluid stream to the reactor. In some aspects, a process fluid can be received at the fluid inlet 231 and pass towards the mixture outlet 235. The sparger 230 can pass into the fluid conduit 242 through a sealed connection and pass a gas to the sparger element 234. The sparger element can create small bubbles in the process fluid, and the fluid flowing around the sparger element 234 can carry the bubbles with the process fluid into the reactor.

In some aspects, a process fluid to be recirculated can be routed to a fluid inlet 231 of the sparger chamber 222, while a gas flow (e.g., air, oxygen, nitrogen) can be provided via a gas source (e.g., a compressor, a gas supply tank) to a gas inlet 233 of the sparger chamber 222. Within the sparger chamber 222, the process fluid can be combined with the gas flow before being reintroduced into the reactor vessel 202. The process fluid-gas mixture outlet 235 of the sparger chamber 222 can be fluidly coupled to a particular sparger outlet 212 of the sparger plate 210, as illustrated in FIG. 3, to supply the mixture of process fluid and gas into the reactor vessel 202.

While the fluid conduit 242 is shown in FIG. 4 as coupling to the sparger conduit 232 at a right angle, any suitable angle can be used. In some aspects, the fluid conduit 242 can be coupled to the sparge conduit 232 at an acute angle (e.g., between about 10 and about 90 degrees) to allow the fluid momentum to be carried along the sparger 230 and/or provide a desired degree of turbulence around the sparger element 234 to mix the bubbles with the process fluid.

The sparger chamber 222 can include a sparger 230 disposed in a sparger conduit 232. The sparger 230 can include a plurality of fine-pore sparging elements 234 that produce smaller bubbles, as compared to drilled pipe spargers. The fine-pore openings in the sparging elements 234 may have a diameter of approximately 0.01-100 micrometers ($\mu$m)). In some embodiments, the fine-pore openings in the sparging elements may have a first diameter of approximately 5 $\mu$m. In some aspects, the sparger conduit 232 may have an inner diameter of approximately 2-4 times larger than that of the outer diameter of the sparging element 234.

In some aspects, a ratio of the diameter of the sparger element to that of the sparger conduit can have a ratio of less than 0.01.

As discussed above, the sparging elements 234 may foul due to their smaller pore sizes. The sparger chamber 222 can include suitable valves to enable the sparger 230 to be fluidly isolated from the process fluid within the reactor vessel, as well as the process fluid. supplied via the fluid inlet 231 of the sparger chamber 222. As such, a sparger 230 of a single sparger chamber 222 may be fluidly isolated, drained, removed, and serviced (e.g., cleaned, repaired, replaced), while the remaining spargers 230 of the sparger assembly 208 remain in operation. Compared to conventional spargers, the presently disclosed sparger assemblies enable the reactor 200 to continuously operate, eliminating reactor 200 downtime for maintenance. In some aspects, the number of sparger assemblies can be chosen to allow a number of the sparger elements to be fouled and/or taken out of service while still allowing the reactor to operate at a desired capacity.

The illustrated sparger chamber 222 can include a number of different valves (e.g., block and bleed valves) to facilitate fluid isolation and removal of the sparger 230 from the sparger conduit 232. In the illustrated embodiment, the gas inlet 233 of the sparger chamber 222 can include an air inlet valve 236 that enables selective isolation of the sparger conduit 232 from the gas source (e.g., an air compressor). The process fluid-gas mixture outlet 235 of the illustrated sparger chamber 222 can include a double block and bleed valve assembly 238 that enables selective isolation of the sparger conduit 232 from the process fluid disposed within the reactor vessel 202. The fluid inlet 231 of the sparger chamber 222 can include a double block and bleed valve assembly 240 that enables selective isolation of the sparger conduit 232 from the process fluid being delivered to the sparger chamber 222 for recirculation.

When the sparger 230 is accessed for servicing, the air inlet valve 236 and the double block and bleed valve assembly 238 may be closed to block the incoming gas flow and to prevent the process fluid in the reactor vessel 202 from entering the sparger conduit 232. Similarly, a double block and bleed valve assembly 240 disposed along a recirculation process fluid conduit 242 may be used to block the incoming process fluid flow from reaching the sparger conduit 232 and to drain remaining process fluid within the sparger chamber 222.

Figure 5:
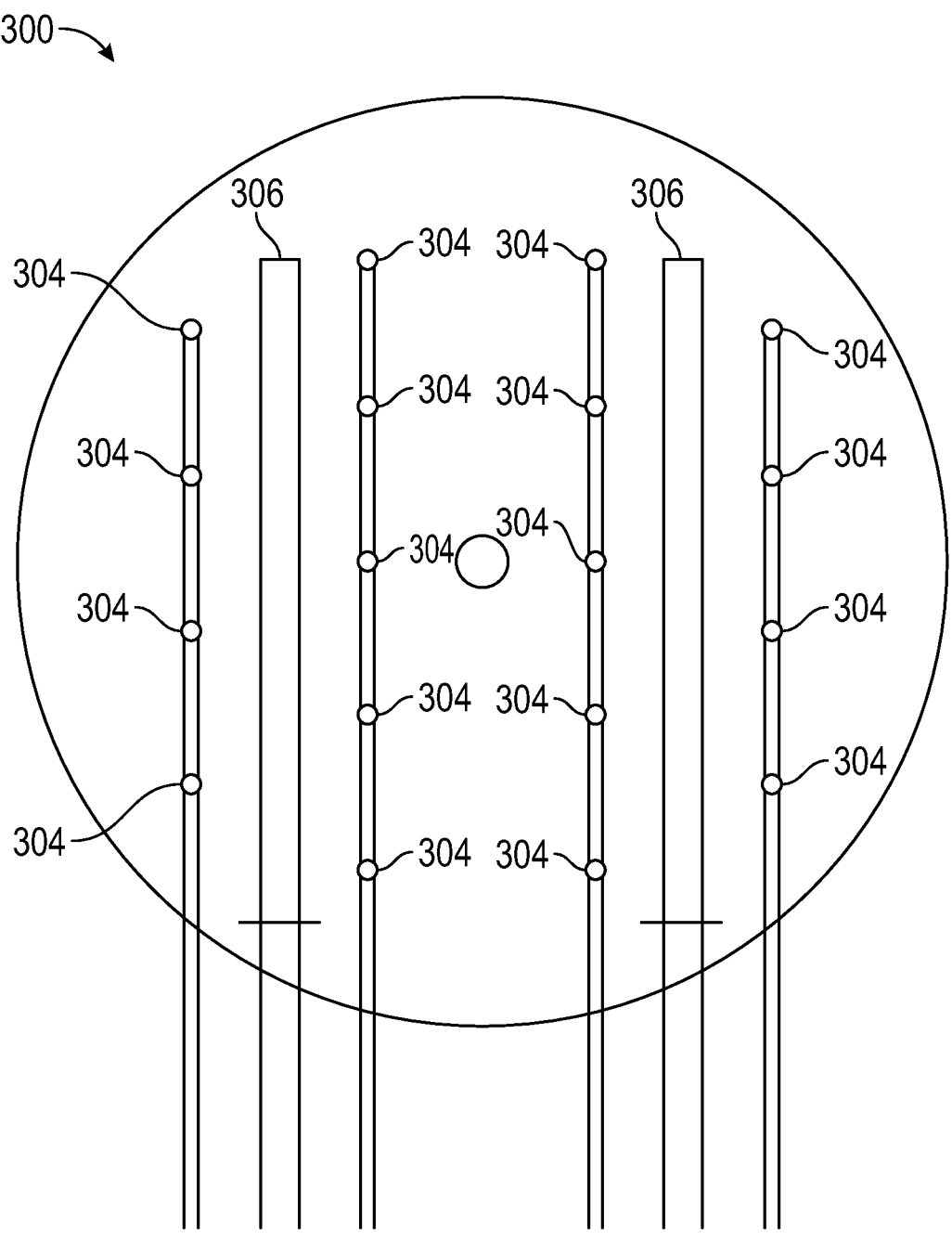
FIG. 5 is a schematic diagram of an embodiment of a header arrangement of the sparger assembly, in accordance with the presently disclosed embodiments.

In certain embodiments, the process fluid and the gas may be supplied to each of the sparger chambers 222 of the reactor vessel 202 via one or more fluid headers and one or more gas headers, respectively. For example, FIG. 5 is a schematic diagram of an embodiment of a header arrangement 300 of the sparger assembly 208, including gas supply lines 302 that are fluidly coupled to a suitable gas source, as well as fluid supply lines 306 that are fluidly coupled to the process fluid return 206. In the illustrated embodiment, the gas inlet 233 of each of the sparger chambers 222, as illustrated in FIG. 4, can be fluidly coupled to at least one of gas outlets 304 of the gas supply lines 302 to enable delivery of the gas flow to the sparger chambers 222. Additionally, the process fluid inlet 231 of each of the sparger chambers 222, as illustrated in FIG. 4, can be fluidly coupled to at least one of the liquid supply lines 306 enable delivery of the process fluid to the sparger chambers 222. In this manner, the process fluid and the gas may be delivered to and combined in the sparger chamber 222, before the mixture is introduced to the reactor vessel 202.

Figure 6:
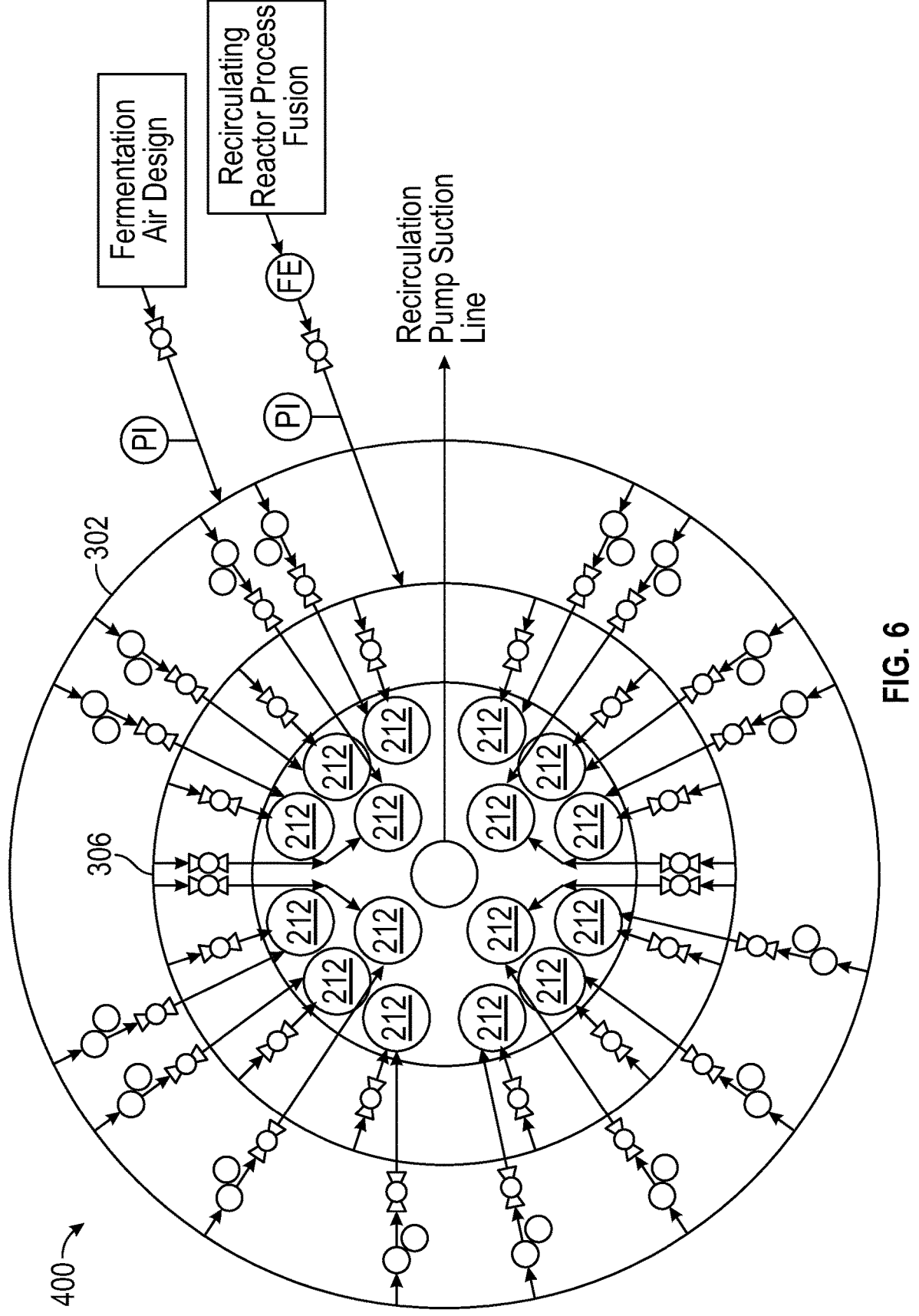
FIG. 6 is a schematic diagram of an embodiment of an alternative header arrangement of the sparger assembly, in accordance with the presently disclosed embodiments.

FIG. 6 is a schematic diagram of an embodiment of an alternative header arrangement 400 of the sparger assembly 208, including gas supply lines 302 that are fluidly coupled to a suitable gas source, as well as fluid supply lines 306 that are fluidly coupled to the process fluid return 206. In the illustrated embodiment, both the liquid supply lines 306 and the gas supply lines 302 may be formed in rings or circular flow paths. For example, the supply lines 302 and 302 may be disposed in concentric rings, as shown in the illustrated embodiment, or configured in any other suitable arrangement. It may be appreciated that using the alternative header arrangement 400 of FIG. 6 may offer greater flexibility in the positioning of the sparger chambers 222 and/or the sparger outlets 212, and may also enable greater ease of access to the supply lines 302 and 306 for inspection and servicing.

Having described various devices, systems, and methods, certain aspects can include, but are not limited to:

In a first aspect, a reactor system comprises: a reactor vessel configured to contain a process fluid; a sparger assembly fluidly coupled to the reactor vessel and configured to supply a mixture of a gas and a process fluid to the reactor vessel, wherein the sparger assembly comprises a plurality of sparger chambers, and wherein each sparger chamber of the plurality of sparger chambers comprises: a process fluid conduit fluidly coupled to a process fluid return of the reactor vessel via a process fluid inlet, wherein the process fluid inlet comprises a first block and bleed valve assembly; a sparger conduit fluidly coupled to the process fluid conduit; a sparger disposed within the sparger conduit and fluidly coupled to a gas source via a gas inlet; and a process fluid-gas mixture outlet that fluidly couples the sparger conduit to the reactor vessel, wherein the process fluid-gas mixture outlet comprises a second block and bleed valve assembly disposed between the sparger conduit and the reactor vessel, wherein the first and second block and bleed valve assemblies are configured to enable the sparger to be fluidly isolated from the reactor vessel.

A second aspect can include the system of the first aspect, wherein the sparger assembly comprises one or more process fluid headers fluidly coupled between the process fluid return of the reactor vessel and the process fluid inlet of each of the plurality of sparger chambers.

A third aspect can include the system of the first or second aspect, wherein the sparger assembly comprises one or more gas headers fluidly coupled between the gas source and the gas inlet of each of the plurality of sparger chambers.

A fourth aspect can include the system of any one of the first to third aspects, wherein the sparger comprises a plurality of fine-pore sparging elements disposed on a surface of the sparger, wherein each of the plurality of pores comprises a first diameter.

A fifth aspect can include the system of the fourth aspect, wherein the sparger conduit comprises a second diameter, wherein a ratio of the first diameter to the second diameter is less than 0.01.

A fourth aspect can include the system of any one of the first to fifth aspects, wherein the reactor vessel comprises a set of fluid recirculation nozzles disposed above the sparger outlets of the sparger assembly and fluidly coupled to the process fluid return of the reactor vessel.

A seventh aspect can include the system of any one of the first to sixth aspects, wherein each process fluid-gas mixture outlet is disposed in a sparger plate in a lower portion of the reactor vessel.

An eighth aspect can include the system of any one of the first to seventh aspects, wherein the sparger assembly is external to the reactor vessel.

In a ninth aspect, a sparger assembly for a reactor comprises: a plurality of sparger chambers, and wherein each sparger chamber of the plurality of sparger chambers comprises: a process fluid conduit fluidly coupled to a process fluid inlet, wherein the process fluid inlet comprises a first block and bleed valve assembly; a sparger conduit fluidly coupled to the process fluid conduit; a sparger disposed within the sparger conduit and fluidly coupled to a gas inlet; and a process fluid-gas mixture outlet fluidly coupled to the sparger conduit, wherein the process fluid-gas mixture outlet comprises a second block and bleed valve assembly, wherein the first block and bleed valve assembly and the second block and bleed valve assembly are configured to enable the sparger assembly to be fluidly isolated.

A tenth aspect can include the sparger of the ninth aspect, wherein the sparger assembly comprises one or more process fluid headers fluidly coupled to the process fluid inlet of each of the plurality of sparger chambers.

An eleventh aspect can include the sparger of the ninth or tenth aspect, wherein the sparger assembly comprises one or more gas headers fluidly coupled to the gas inlet of each of the plurality of sparger chambers.

A twelfth aspect can include the sparger of any one of the ninth to eleventh aspects, wherein the sparger comprises a plurality of fine-pore sparging elements disposed on a surface of the sparger, wherein each of the plurality of pores comprises a first diameter.

A thirteenth aspect can include the sparger of the twelfth aspect, wherein the sparger conduit comprises a second diameter, wherein a ratio of the first diameter to the second diameter is less than 0.01.

A fourteenth aspect can include the sparger of any one of the ninth to thirteenth aspects, wherein the reactor vessel comprises a set of fluid recirculation nozzles disposed above the sparger outlets of the sparger assembly and fluidly coupled to the process fluid return of the reactor vessel.

A fifteenth aspect can include the sparger of any one of the ninth to fourteenth aspects, wherein the process fluid conduit is coupled to the sparger conduit at an angle between 10 and 90 degrees.

In a sixteenth aspect, a method of providing a gas to a fluid within a reactor comprises: passing a process fluid to a sparger chamber through a first valve assembly; passing a gas through a sparger element within the sparger chamber; forming bubbles within the process fluid within the sparger chamber to form a mixed fluid; and passing the mixed fluid out of the sparger chamber and into a reactor vessel.

A seventeenth aspect can include the method of the sixteenth aspect, further comprising: passing the process fluid out of the reactor vessel, wherein passing the process fluid to the sparger chamber comprises recycling the process fluid from the reactor vessel to the sparger chamber.

An eighteenth aspect can include the method of the sixteenth or seventeenth aspect, wherein the sparger chamber is external to the reactor vessel, and wherein passing the mixed fluid out of the sparger chamber and into the reactor vessel comprises passing the mixed fluid through an opening in a lower portion of the reactor vessel.

A nineteenth aspect can include the method of any one of the sixteenth to eiteenth aspects, wherein the bubbles have a average diameter of 0.2 cm or less.

A twentieth aspect can include the method of any one of the sixteenth to nineteenth aspects, wherein the sparger element has openings forming the bubbles, and wherein the openings have a size of between 0.01-100 micrometers, This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A reactor system, comprising:
a reactor vessel configured to contain a process fluid;
a sparger assembly fluidly coupled to and external to the reactor vessel and configured to supply a mixture of a gas and a process fluid to the reactor vessel, wherein the sparger assembly comprises a plurality of sparger chambers, and wherein each sparger chamber of the plurality of sparger chambers comprises:
a process fluid conduit fluidly coupled to a process fluid return of the reactor vessel via a process fluid inlet, wherein the process fluid inlet comprises a first block and bleed valve assembly;
a sparger conduit fluidly coupled to the process fluid conduit, wherein the first block and bleed valve assembly is configured to block process fluid flow from reaching the sparger conduit and to drain process fluid from the sparger chamber;
a sparger disposed within the sparger conduit and fluidly coupled to a gas source via a gas inlet; and
a process fluid-gas mixture outlet that fluidly couples the sparger conduit to the reactor vessel, wherein the process fluid-gas mixture outlet comprises a second block and bleed valve assembly disposed between the sparger conduit and the reactor vessel, wherein the second block and bleed valve assembly is configured to selectively block process fluid-gas mixture within the sparger conduit from reaching the reactor vessel and to prevent process fluid from the reactor vessel from entering the sparger conduit.

2. The system of claim 1, wherein the sparger assembly comprises one or more process fluid headers fluidly coupled between the process fluid return of the reactor vessel and the process fluid inlet of each of the plurality of sparger chambers.

3. The system of claim 1, wherein the sparger assembly comprises one or more gas headers fluidly coupled between the gas source and the gas inlet of each of the plurality of sparger chambers.

4. The system of claim 1, wherein the sparger comprises a plurality of fine-pore sparging elements disposed on a surface of the sparger, wherein each of the plurality of pores comprises a first diameter.

5. The system of claim 4, wherein the sparger conduit comprises a second diameter, wherein a ratio of the first diameter to the second diameter is less than 0.01.

6. The system of claim 1, wherein the reactor vessel comprises a set of fluid recirculation nozzles disposed above the sparger outlets of the sparger assembly and fluidly coupled to the process fluid return of the reactor vessel.

7. The system of claim 1, wherein each process fluid-gas mixture outlet is disposed in a sparger plate in a lower portion of the reactor vessel.

8. The system of claim 1, wherein the sparger assembly is external to the reactor vessel.

9. A sparger assembly for a reactor comprising a reactor vessel, the sparger assembly being external to the reactor vessel and comprising:

a plurality of sparger chambers, and wherein each sparger chamber of the plurality of sparger chambers comprises:

a process fluid conduit fluidly coupled to a process fluid inlet, wherein the process fluid inlet comprises a first block and bleed valve assembly;

a sparger conduit fluidly coupled to the process fluid conduit, wherein the first block and bleed valve assembly is configured to block process fluid flow from reaching the sparger conduit and to drain process fluid from the sparger chamber;

a sparger disposed within the sparger conduit and fluidly coupled to a gas inlet; and a process fluid-gas mixture outlet fluidly coupled to the sparger conduit, wherein the process fluid-gas mixture outlet comprises a second block and bleed valve assembly, wherein the second block and bleed valve assembly is configured to selectively block process fluid-gas mixture within the sparger conduit from reaching the reactor vessel and to prevent process fluid from the reactor vessel from entering the sparger conduit.

10. The sparger of claim 9, wherein the sparger assembly comprises one or more process fluid headers fluidly coupled to the process fluid inlet of each of the plurality of sparger chambers.

11. The sparger of claim 9, wherein the sparger assembly comprises one or more gas headers fluidly coupled to the gas inlet of each of the plurality of sparger chambers.

12. The sparger of claim 9, wherein the sparger comprises a plurality of fine-pore sparging elements disposed on a surface of the sparger, wherein each of the plurality of pores comprises a first diameter.

13. The sparger of claim 12, wherein the sparger conduit comprises a second diameter, wherein a ratio of the first diameter to the second diameter is less than 0.01.

14. The sparger of claim 9, wherein the reactor vessel comprises a set of fluid recirculation nozzles disposed above the sparger outlets of the sparger assembly and fluidly coupled to the process fluid return of the reactor vessel.

15. The sparger of claim 9, wherein the process fluid conduit is coupled to the sparger conduit at an angle between 10 and 90 degrees.

16. A method of providing a gas to a fluid within a reactor, the method comprising:

passing a process fluid to a sparger chamber external to the reactor through a first block and bleed valve assembly;

passing a gas through a sparger element within the sparger chamber;

forming bubbles within the process fluid within the sparger chamber to form a mixed fluid; and passing the mixed fluid out of the sparger chamber and into a reactor vessel through a second block and bleed valve assembly, wherein the first block and bleed valve assembly is configured to block process fluid flow from reaching the sparger chamber and to drain process fluid from the sparger chamber, and wherein the second block and bleed valve assembly is configured to selectively block the mixed fluid within the sparger chamber from reaching the reactor vessel and to prevent process fluid from the reactor vessel from entering the sparger chamber.

17. The method of claim 16, further comprising:

passing the process fluid out of the reactor vessel, wherein passing the process fluid to the sparger chamber comprises recycling the process fluid from the reactor vessel to the sparger chamber.

18. The method of claim 16, wherein the sparger chamber is external to the reactor vessel, and wherein passing the mixed fluid out of the sparger chamber and into the reactor vessel comprises passing the mixed fluid through an opening in a lower portion of the reactor vessel.

19. The method of claim 16, wherein the bubbles have a average diameter of 0.2 cm or less.

20. The method of claim 16, wherein the sparger element has openings forming the bubbles, and wherein the openings have a size of between 0.01-100 micrometers.

\* \* \* \* \*